United States Patent
Koizumi (10) Patent No.: US 9,983,069 B2
(45) Date of Patent: May 29, 2018

(54) MEASURING APPARATUS AND MEASURING METHOD

(71) Applicant: Oki Electric Industry Co., Ltd., Tokyo (JP)

(72) Inventor: Kengo Koizumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 316 days.

(21) Appl. No.: 14/996,197

(22) Filed: Jan. 14, 2016

(65) Prior Publication Data

US 2016/0290857 A1 Oct. 6, 2016

(30) Foreign Application Priority Data

Mar. 31, 2015 (JP) .................. 2015-072546

(51) Int. Cl.
| | | |
|---|---|---|
| *G01J 1/04* | (2006.01) | |
| *G01J 9/04* | (2006.01) | |
| *G01D 5/353* | (2006.01) | |
| *G01K 11/32* | (2006.01) | |
| *G01J 3/44* | (2006.01) | |

(52) U.S. Cl.
CPC ......... *G01K 11/32* (2013.01); *G01D 5/35364* (2013.01); *G01J 3/4412* (2013.01); *G01J 9/04* (2013.01); *G01K 2011/322* (2013.01)

(58) Field of Classification Search
CPC . G01K 11/32; G01K 2011/322; G01J 3/4412; G01J 9/04; G01D 5/35364; G01D 5/35358; G01D 5/35354; G01D 5/35338; G01D 5/353; G01D 5/34; G01D 5/32; G01D 5/28; G01D 5/268
See application file for complete search history.

(56) References Cited

U.S. PATENT DOCUMENTS

| | | | | |
|---|---|---|---|---|
| 7,650,080 B2* | 1/2010 | Yap | ............. | G02F 2/02 |
| | | | | 398/161 |
| 8,922,874 B2* | 12/2014 | Inafune | ............. | H01S 3/06754 |
| | | | | 359/330 |
| 2006/0018586 A1* | 1/2006 | Kishida | ............. | G01B 11/16 |
| | | | | 385/12 |

(Continued)

FOREIGN PATENT DOCUMENTS

JP 2001-165808 A 6/2001

OTHER PUBLICATIONS

"Brillouin Optical-Fiber Time Domain Reflectometry", pp. 382-390, IEICE Trans. Commun., vol. E76-B, No. 4 Apr. 1993.

*Primary Examiner* — John Lee
(74) *Attorney, Agent, or Firm* — Rabin & Berdo, P.C.

(57) ABSTRACT

A measuring apparatus includes a light source unit configured to generate probe light, a bifurcating unit configured to cause Brillouin backscattered light occurring from the probe light to bifurcate into first light, which propagates through a first optical path, and second light, which propagates through a second optical path, a delay unit configured to delay one of the first light and the second light, an optical multiplexer configured to multiplex the first light and the second light to generate multiplexed light, and a coherent detector configured to perform homodyne detection of the multiplexed light and to output a difference frequency obtained as a result of the detection as a phase-difference signal.

9 Claims, 7 Drawing Sheets

(56) References Cited

U.S. PATENT DOCUMENTS

| | | | |
|---|---|---|---|
| 2007/0171402 A1* | 7/2007 | Watley | E21B 47/102 356/73.1 |
| 2008/0068586 A1* | 3/2008 | Kishida | G01B 11/18 356/32 |
| 2010/0165327 A1* | 7/2010 | Hartog | G01K 11/32 356/73.1 |
| 2010/0238427 A1* | 9/2010 | Sasaoka | G01B 11/18 356/73.1 |
| 2011/0199607 A1* | 8/2011 | Kanellopoulos | G01M 11/3118 356/73.1 |
| 2012/0067118 A1* | 3/2012 | Hartog | E21B 41/00 73/152.16 |
| 2012/0281201 A1* | 11/2012 | Brown | G01K 11/32 356/33 |
| 2013/0229649 A1* | 9/2013 | Li | G01M 5/0091 356/73.1 |
| 2014/0083197 A1* | 3/2014 | Zadok | H04B 10/071 73/800 |
| 2014/0268110 A1* | 9/2014 | Hartog | G01D 5/35364 356/73.1 |
| 2014/0306101 A1* | 10/2014 | Zornoza Indart | G01D 5/35364 250/227.14 |
| 2015/0003834 A1* | 1/2015 | Shan | G01D 5/35364 398/116 |
| 2016/0290857 A1* | 10/2016 | Koizumi | G01D 5/35364 |
| 2017/0254708 A1* | 9/2017 | Koizumi | G01D 5/28 |

* cited by examiner

MEASURING APPARATUS AND MEASURING METHOD

CROSS REFERENCE TO RELATED APPLICATION(S)

This application is based upon and claims benefit of priority from Japanese Patent Application No. 2015-072546, filed on Mar. 31, 2015, the entire contents of which are incorporated herein by reference.

BACKGROUND

The present invention relates to measuring apparatuses and measuring methods that use Brillouin scattered light.

With the development of optical fiber communication, distributed optical fiber sensing using the optical fiber itself as a sensing medium has been actively researched. A representative example of distributed optical fiber sensing is optical time domain reflectometry (OTDR) in which an optical pulse is input from one end of the optical fiber and light backscattered within the optical fiber is measured relative to time. Examples of backscattering within the optical fiber include Rayleigh scattering, Brillouin scattering, and Raman scattering. Among these examples, one that measures spontaneous Brillouin scattering is called Brillouin OTDR (BOTDR) (for example, see "T. Kurashima et al., "Brillouin Optical-fiber time domain reflectometry", IEICE Trans. Commun , vol. E76-B, no. 4, pp. 382 to 390 (1993)").

Brillouin scattering is observed at a location shifted toward the Stokes side or the anti-Stokes side by a frequency of about a GHz relative to the central frequency of the optical pulse input to the optical fiber, and a spectrum thereof is called a Brillouin gain spectrum. A frequency shift amount and a spectral line width of a Brillouin gain spectrum (BGS) are called a Brillouin frequency shift (BFS) and a Brillouin line width, respectively, and vary depending on the material of the optical fiber and the wavelength of the optical pulse input to the optical fiber. For example, in a case where an optical pulse with a wavelength of 1.55 µm is input to a silica-based single-mode optical fiber, it is reported that the –BFS is about 11 GHz and the Brillouin line width is about 30 MHz.

A BFS is known to change linearly at a rate of about 500 MHz/% relative to strain in the optical fiber. When this is converted into tensile strain and temperature, 0.049 MHz/pc and 1.0 MHz/° C. at 1.55 µm wavelength are obtained, respectively.

Accordingly, in BOTDR, strain and temperature distribution in the longitudinal direction of the optical fiber can be measured. Therefore, BOTDR is attracting attention as a technology for monitoring large-scale structures, such as bridges and tunnels.

Since BOTDR measures the spectrum waveform of spontaneous Brillouin scattered light occurring within the optical fiber, heterodyne detection of separately-prepared reference light is normally performed. The intensity of spontaneous Brillouin scattered light is smaller than that of Raleigh scattered light by two to three digits. Therefore, heterodyne detection is effective for improving minimal light-receiving sensitivity.

Figure 6:
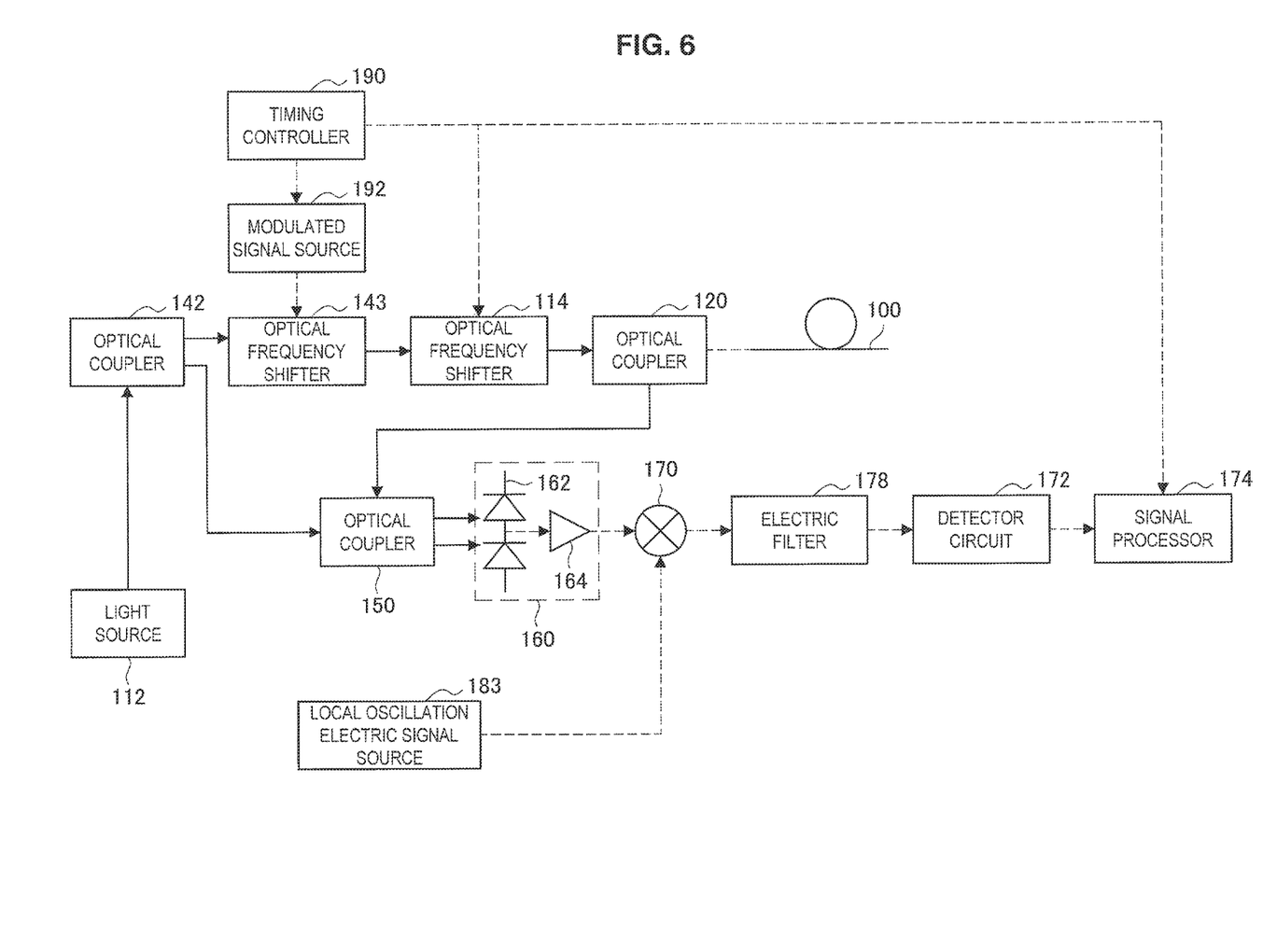
FIG. 6 is a schematic block diagram of an optical-fiber strain measuring apparatus in the related art.

BOTDR in the related art will be described with reference to FIG. 6 (for example, see JP 2001-165808A). FIG. 6 is a schematic block diagram of an optical-fiber strain measuring apparatus in the related art.

Continuous waveform (CW) light output from a light source 112 is bifurcated into two light beams by an optical coupler 142. One of the two bifurcated light beams is used as reference light, whereas the other light beam undergoes a frequency shift equivalent to a Brillouin frequency by an optical frequency shifter 143 and is subsequently made into a pulse-like probe light by an optical pulse generator 114.

This probe light is input to an optical fiber 100 to be measured (i.e., a fiber to be measured) via an optical coupler 120. Brillouin backscattered light from the optical fiber 100 to be measured is multiplexed with the reference light in an optical coupler 150 and subsequently undergoes heterodyne detection by a receiver 160 constituted of a balanced photodiode (PD) 162 and a field-effect-transistor (FET) amplifier 164.

Since the probe light is frequency-shifted by about a Brillouin frequency by the optical frequency shifter 143, the frequency of a beat signal generated as a result of heterodyne detection is low. After using a mixer 170 and an electric filter 178 to downshift the frequency of the beat signal, the power and the amplitude of an intermediate frequency (IF) signal obtained as a result of square-law detection or envelope detection are measured by a detector circuit 172. The results are sent to a signal processor 174.

Figure 7:
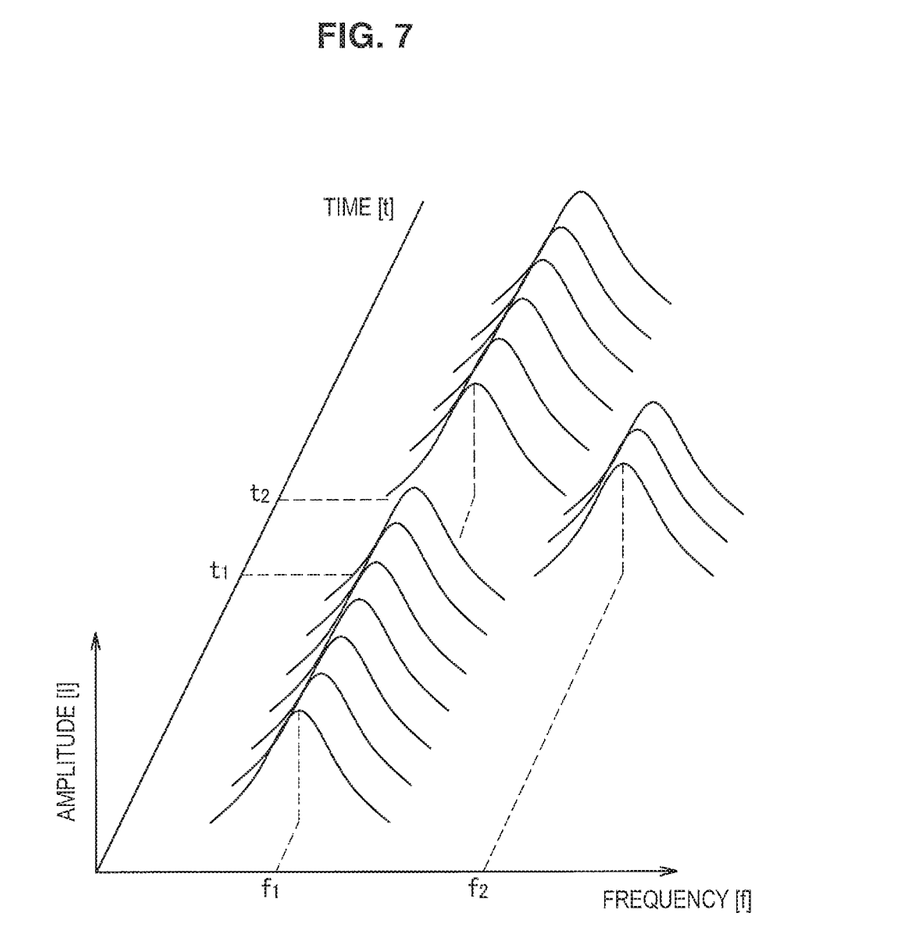
FIG. 7 is a schematic diagram illustrating a method for acquiring three-dimensional information related to time, amplitude, and frequency in the optical-fiber strain measuring apparatus in the related art.

Because BOTDR deals with information about frequency spectrum distribution in the longitudinal direction of the optical fiber, three-dimensional information related to time, amplitude, and frequency has to be acquired. A method for acquiring three-dimensional information related to time, amplitude, and frequency in BOTDR will be described with reference to FIG. 7. FIG. 7 is a schematic diagram illustrating the method for acquiring three-dimensional information related to time, amplitude, and frequency in the optical-fiber strain measuring apparatus in the related art. In order to measure the entire Brillouin frequency spectrum in the technology disclosed in JP 2001-165808A mentioned above, two-dimensional information related to time t and amplitude I is acquired by sweeping a frequency f of a local oscillation electric signal source 183.

SUMMARY

Because spontaneous Brillouin scattered light is extremely weak, a sufficient signal-to-noise (S/N) ratio cannot be ensured even by applying heterodyne detection. As a result, an averaging process for improving the S/N ratio has to be performed. Due to this averaging process and the acquisition of the aforementioned three-dimensional information, it is difficult to shorten the measurement time in the optical-fiber strain measuring apparatus in the related art.

The present invention has been made in view of the aforementioned problems. An object of the present invention is to provide an optical-fiber strain measuring apparatus and an optical-fiber strain measuring method that use spontaneous Brillouin scattered light and that measure a frequency change of light as a phase difference of a beat signal provided as a result of coherent detection so as to acquire two-dimensional information related to time and phase.

According to an embodiment of the present invention, there is provided a measuring apparatus including: a light source unit configured to generate probe light; an optical fiber configured to generate, from the probe light input thereto, Brillouin backscattered light; a bifurcating unit configured to cause the Brillouin backscattered light to bifurcate into first light and second light; a delay unit configured to delay one of the first light and the second light; an optical multiplexer configured to multiplex the first light and the second light to generate multiplexed light; and a coherent detector configured to perform homodyne detection of the multiplexed light and to output a difference frequency obtained as a result of the homodyne detection as a phase-difference signal.

According to another embodiment of the present invention, there is provided a measuring apparatus including: a light source unit configured to generate probe light; a bifurcating unit configured to cause Brillouin backscattered light occurring from the probe light to bifurcate into first light, which propagates through a first optical path, and second light, which propagates through a second optical path; a delay unit configured to delay one of the first light and the second light; an optical multiplexer configured to multiplex the first light and the second light to generate multiplexed light; and a coherent detector configured to perform homodyne detection of the multiplexed light and to output a difference frequency obtained as a result of the homodyne detection as a phase-difference signal.

The Brillouin backscattered light may occur from the probe light propagating through an optical fiber.

According to another embodiment of the present invention, there is provided a measuring apparatus including: a light source unit configured to generate probe light; a bifurcating unit configured to cause Brillouin backscattered light, which occurs in an optical fiber from the probe light input to the optical fiber, to bifurcate into first light, which propagates through a first optical path, and second light, which propagates through a second optical path; a shifter provided in one of the first optical path and the second optical path and configured to shift a frequency of one of the first light and the second light by about a beat frequency; a delay unit configured to delay one of the first light and the second light; an optical multiplexer configured to multiplex the first light and the second light to generate multiplexed light; a coherent detector configured to perform heterodyne detection of the multiplexed light and to output a difference frequency obtained as a result of the heterodyne detection as a first electric signal; an electric signal generator configured to generate a second electric signal having a frequency equal to a frequency of the first electric signal; and a mixer configured to perform homodyne detection of the first electric signal and the second electric signal and to output a difference frequency obtained as a result of the homodyne detection as a phase-difference signal.

According to another embodiment of the present invention, there is provided a measuring apparatus including: a light source unit configured to generate probe light; a bifurcating unit configured to cause Brillouin backscattered light, which occurs in an optical fiber from the probe light input to the optical fiber, to bifurcate into first light, which propagates through a first optical path, and second light, which propagates through a second optical path; a first shifter provided in the first optical path and configured to shift a frequency of the first light by about a first frequency; a second shifter provided in the second optical path and configured to shift a frequency of the second light by about a second frequency; a delay unit configured to delay one of the first light and the second light; an optical multiplexer configured to multiplex the first light and the second light to generate multiplexed light; a coherent detector configured to perform heterodyne detection of the multiplexed light and to output a difference frequency obtained as a result of the heterodyne detection as a first electric signal; an electric signal generator configured to generate a second electric signal having a frequency equal to a frequency of the first electric signal; and a mixer configured to perform homodyne detection of the first electric signal and the second electric signal and to output a difference frequency obtained as a result of the homodyne detection as a phase-difference signal.

According to another embodiment of the present invention, there is provided a measuring method including: generating probe light; causing Brillouin backscattered light occurring from the probe light to bifurcate into first light, which propagates through a first optical path, and second light, which propagates through a second optical path; delaying one of the first light and the second light; multiplexing the first light and the second light to generate multiplexed light; and performing homodyne detection of the multiplexed light and outputting a difference frequency obtained as a result of the homodyne detection as a phase-difference signal.

The Brillouin backscattered light may occur from the probe light propagating through an optical fiber.

According to another embodiment of the present invention, there is provided a measuring method including: generating probe light; causing Brillouin backscattered light, which occurs in an optical fiber from the probe light input to the optical fiber, to bifurcate into first light, which propagates through a first optical path, and second light, which propagates through a second optical path; shifting a frequency of one of the first light and the second light by about a beat frequency; delaying one of the first light and the second light; multiplexing the first light and the second light to generate multiplexed light; performing heterodyne detection of the multiplexed light and outputting a difference frequency obtained as a result of the heterodyne detection as a first electric signal; generating a second electric signal having a frequency equal to a frequency of the first electric signal; and performing homodyne detection of the first electric signal and the second electric signal and outputting a difference frequency obtained as a result of the homodyne detection as a phase-difference signal.

According to another embodiment of the present invention, there is provided a measuring method including: generating probe light; causing Brillouin backscattered light, which occurs in an optical fiber from the probe light input to the optical fiber, to bifurcate into first light, which propagates through a first optical path, and second light, which propagates through a second optical path; shifting a frequency of the first light by about a first frequency; shifting a frequency of the second light by about a second frequency; delaying one of the first light and the second light; multiplexing the first light and the second light to generate multiplexed light; performing heterodyne detection of the multiplexed light and outputting a difference frequency obtained as a result of the heterodyne detection as a first electric signal; generating a second electric signal having a frequency equal to a frequency of the first electric signal; and performing homodyne detection of the first electric signal and the second electric signal and outputting a difference frequency obtained as a result of the homodyne detection as a phase-difference signal.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

First Embodiment

Figure 1:
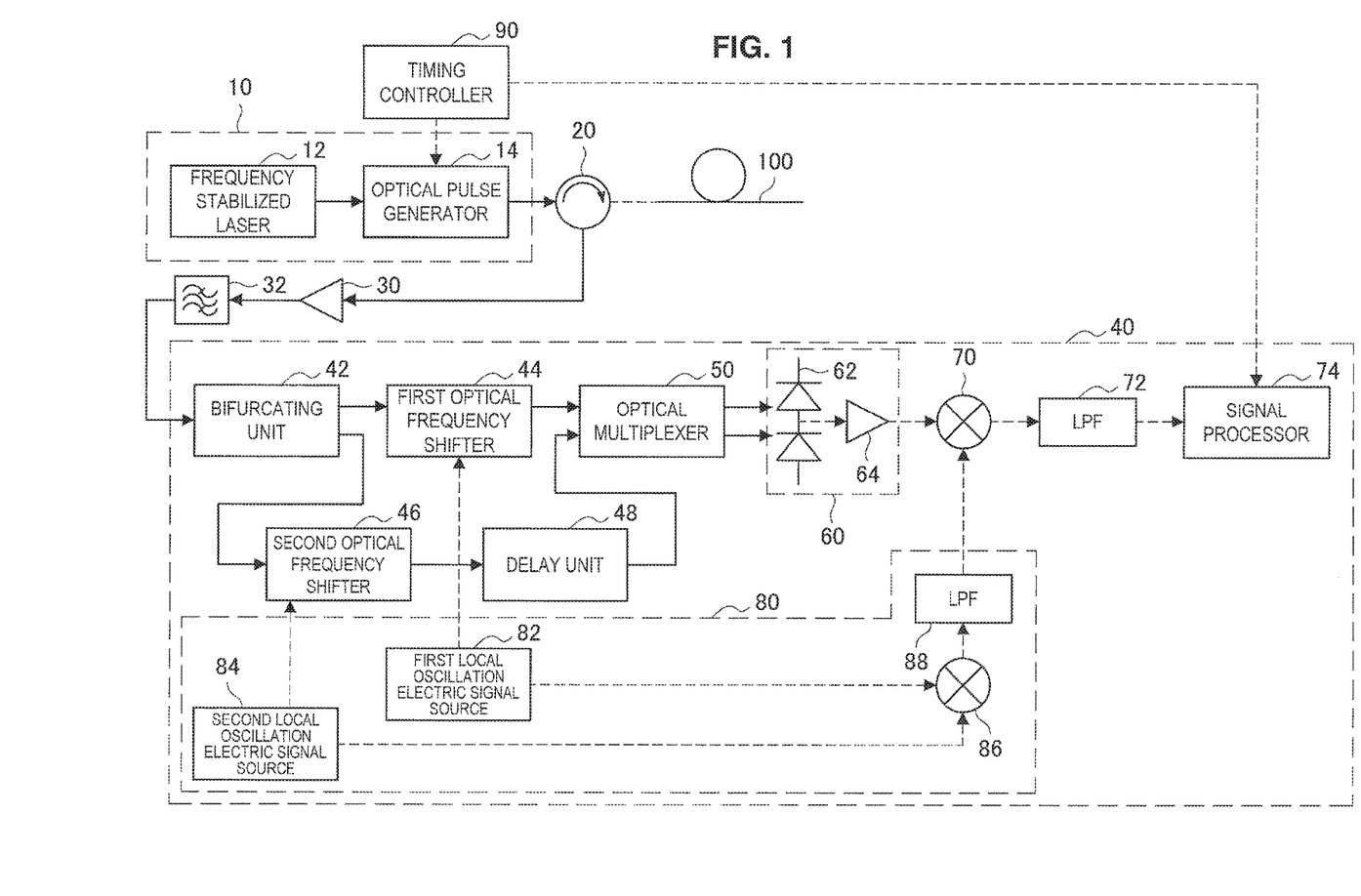
FIG. 1 is a schematic block diagram of a first optical-fiber strain measuring apparatus.

An optical-fiber strain measuring apparatus (also referred to as "first optical-fiber strain measuring apparatus" hereinafter) according to a first embodiment will be described with reference to FIG. 1. FIG. 1 is a schematic block diagram of the first optical-fiber strain measuring apparatus.

The first optical-fiber strain measuring apparatus includes a light source unit 10, a circulator 20, an optical amplifier 30, an optical bandpass filter 32, a self-delayed heterodyne interferometer 40, and a timing controller 90.

The light source unit 10 generates probe light. The light source unit 10 includes a light source 12 that generates CW light and an optical pulse generator 14 that generates an optical pulse from the CW light.

The first optical-fiber strain measuring apparatus measures a phase difference in accordance with a frequency change. Therefore, a frequency fluctuation of the light source 12 has to be sufficiently smaller than a BFS. Thus, a frequency stabilized laser is used as the light source 12. For example, assuming that the strain of an optical fiber 100 (also referred to as "optical fiber to be measured" hereinafter) as an object to be measured is 0.008%, the BFS is equivalent to 4 MHz. Therefore, in order to measure strain of about 0.008%, it is desirable that the frequency fluctuation of the light source 12 be sufficiently smaller than 4 MHz.

The optical pulse generator 14 is formed by using any suitable acousto-optic (AO) modulator or electro-optic (EO) modulator known in the related art. The optical pulse generator 14 generates an optical pulse from CW light in accordance with an electric pulse generated at the timing controller 90. A repeating cycle of this optical pulse is set to be longer than the time it takes for the optical pulse to reciprocate through the optical fiber 100 to be measured. This optical pulse is output as probe light from the light source unit 10.

The probe light output from the light source unit 10 travels through the circulator 20 and enters the optical fiber 100 to be measured. Alternatively, an optical coupler may be used in place of the circulator 20.

Backscattered light from the optical fiber 100 to be measured is sent to the optical amplifier 30 via the circulator 20. The backscattered light amplified at the optical amplifier 30 is sent to the optical bandpass filter 32. The optical bandpass filter 32 has a transmission band of about 10 GHz and only transmits spontaneous Brillouin scattered light. This spontaneous Brillouin scattered light is sent to the self-delayed heterodyne interferometer 40. A signal $E_0(t)$ of the spontaneous Brillouin scattered light output from the optical bandpass filter 32 at a time point t is expressed by Equation (1) below.

$$E_0(t)=A_0\exp\{j(2\pi f_b t+\varphi_0)\} \quad (1)$$

In this case, $A_0$ denotes the amplitude, $f_b$ denotes the optical frequency of the spontaneous Brillouin scattered light, and $\varphi_0$ denotes the initial phase.

The self-delayed heterodyne interferometer 40 includes a bifurcating unit 42, a first optical frequency shifter 44, a second optical frequency shifter 46, a delay unit 48, an optical multiplexer 50, a coherent detector 60, a mixer 70, a low-pass filter (LPF) 72, an electric signal generator 80, and a signal processor 74.

The electric signal generator 80 includes a first local oscillation electric signal source 82, a second local oscillation electric signal source 84, a mixer 86, and a low-pass filter (LPF) 88. The first local oscillation electric signal source 82 and the second local oscillation electric signal source 84 may be located outside the electric signal generator 80. The first local oscillation electric signal source 82 generates an electric signal of a first frequency $f_1$. The second local oscillation electric signal source 84 generates an electric signal of a second frequency $f_2$. The mixer 86 generates a sum frequency component and a difference frequency component of the first frequency $f_1$ and the second frequency $f_2$ from the electric signal of the first frequency $f_1$ and the electric signal of the second frequency $f_2$. The LPF 88 generates a beat signal of a difference frequency component $\Delta f$ (=$f_1$-$f_2$) from the signals generated at the mixer 86.

The bifurcating unit 42 receives, via the optical bandpass filter 32, Brillouin backscattered light generated in the optical fiber 100 to be measured due to the probe light and causes the Brillouin backscattered light to bifurcate to a first optical path and a second optical path.

The first optical frequency shifter 44 is provided in the first optical path. The first optical frequency shifter 44 uses the electric signal of the first frequency $f_1$ generated at the first local oscillation electric signal source 82 so as to apply a frequency shift of the first frequency $f_1$ to the light propagating through the first optical path.

The second optical frequency shifter 46 is provided in the second optical path. The second optical frequency shifter 46 uses the electric signal of the second frequency $f_2$ generated at the second local oscillation electric signal source 84 so as to apply a frequency shift of the second frequency $f_2$ to the light propagating through the second optical path.

In the measuring apparatus in the related art disclosed in, for example, JP 2001-165808A, a frequency shift of about several tens of GHz corresponding to a BFS is applied. In contrast, in the first optical-fiber strain measuring apparatus, the first frequency $f_1$ and the second frequency $f_2$ are about several tens of MHz. Therefore, a compact and inexpensive frequency shifter can be used, as compared with the measuring apparatus in the related art.

Furthermore, in this configuration example, the delay unit 48 is provided in the second optical path. The delay unit 48 applies a delay time τ to the light propagating through the second optical path.

The optical multiplexer 50 generates multiplexed light by multiplexing the light propagating through the first optical path and the light propagating through the second optical path. A light signal $E_1(t)$ propagating through the first optical path and a light signal $E_2(t-\tau)$ propagating through the second optical path, which are to enter the optical multiplexer 50, are expressed by Equations (2) and (3) below.

$$E_1(t)=A_1\exp\{j(2\pi f_b t+2\pi f_1 t+\varphi_1)\} \quad (2)$$

$$E_2(t-\tau)=A_2\exp[j\{2\pi f_b(t-\tau)+2\pi f_2 t+\varphi_2\}] \quad (3)$$

In this case, $A_1$ and $A_2$ respectively denote the amplitudes of $E_1(t)$ and $E_2(t-\tau)$, and $\varphi_1$ and $\varphi_2$ respectively denote the initial phases of $E_1(t)$ and $E_2(t-\tau)$.

The coherent detector 60 performs heterodyne detection of the multiplexed light and generates a beat signal. For example, the coherent detector 60 includes a balanced photodiode (PD) 62 and a field-effect-transistor (FET) amplifier 64. A beat signal I provided as a result of the heterodyne detection is expressed by Equation (4) below.

$$I=2A_1A_2\cos\{2\pi(\Delta f t+f_b\tau)+\varphi_1-\varphi_2\} \quad (4)$$

The beat signal generated at the coherent detector 60 is sent as a first electric signal to the mixer 70. Furthermore, the beat signal generated at the electric signal generator 80 is sent as a second electric signal to the mixer 70.

The mixer 70 performs homodyne detection of the first electric signal and the second electric signal and generates a homodyne signal. Since the first and second electric signals, which are beat signals, both have a beat frequency $\Delta f$, a change of $2\pi f_b t$ is output as a phase difference as a result of performing the homodyne detection of these signals. The Brillouin frequency $f_b$ changes due to two factors, which are fluctuations in the oscillation frequency of the light source 12 and strain in the optical fiber 100 to be measured. However, by using a frequency stabilized laser as the light source 12, the effect by the strain in the optical fiber 100 to be measured becomes dominant Assuming that a BFS $\Delta f_b$ has occurred due to local strain in the optical fiber 100 to be measured, Equation (4) mentioned above can be rewritten as Equation (5) below.

$$I=2A_1A_2\cos[2\pi\{\Delta f t+(f_b+\Delta f_b(t))\tau\}+\varphi_1-\varphi_2] \quad (5)$$

The low-pass filter 72 cuts off a sum frequency component from the homodyne signal and generates a phase-difference signal indicating a voltage value corresponding to the phase difference. This phase-difference signal is sent to the signal processor 74 where predetermined processing is performed.

Figure 2:
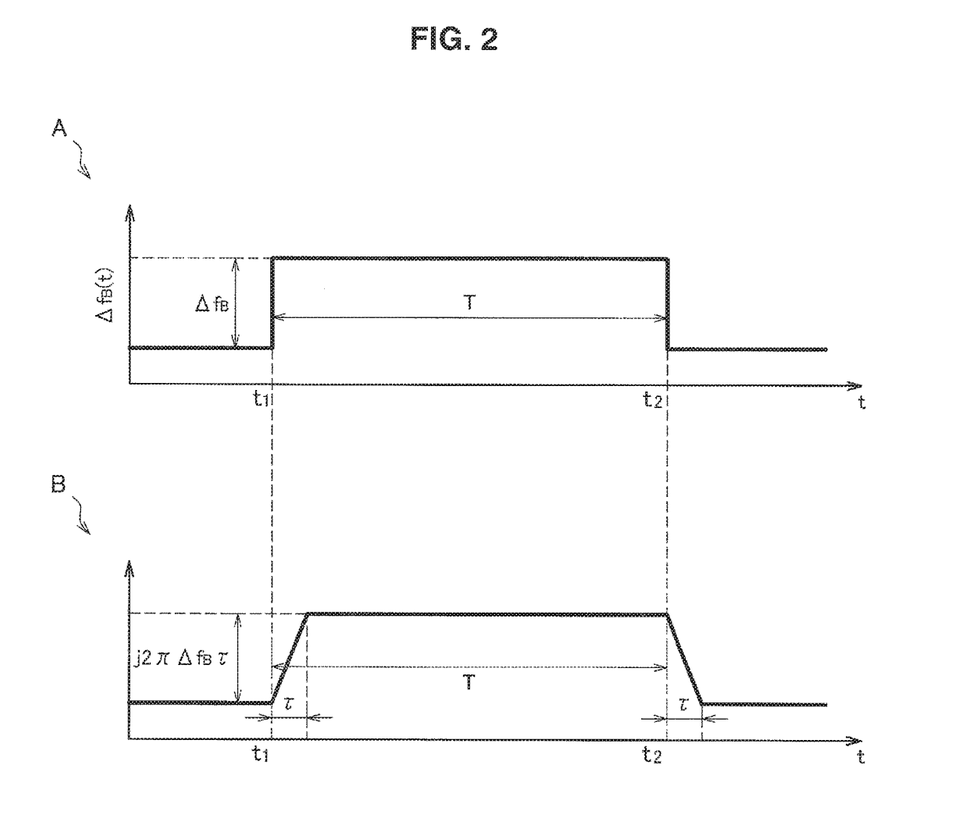
FIG. 2 is a schematic diagram illustrating a BFS and a phase change of a beat signal.

Parts A and B in FIG. 2 schematically illustrate a BFS and a phase change of a beat signal. In part A in FIG. 2, the abscissa denotes time t, whereas the ordinate denotes frequency. In part B in FIG. 2, the abscissa denotes time t, whereas the ordinate denotes voltage.

The time on the abscissa indicates a location where Brillouin scattering has occurred. Specifically, in a case where Brillouin backscattered light is input after an elapse of time t relative to the time at which probe light is output, if the propagation speed of light within the optical fiber 100 to be measured is defined as v, Brillouin backscattering has occurred at a position vt/2 from an input end of the optical fiber 100 to be measured.

Figure 3:
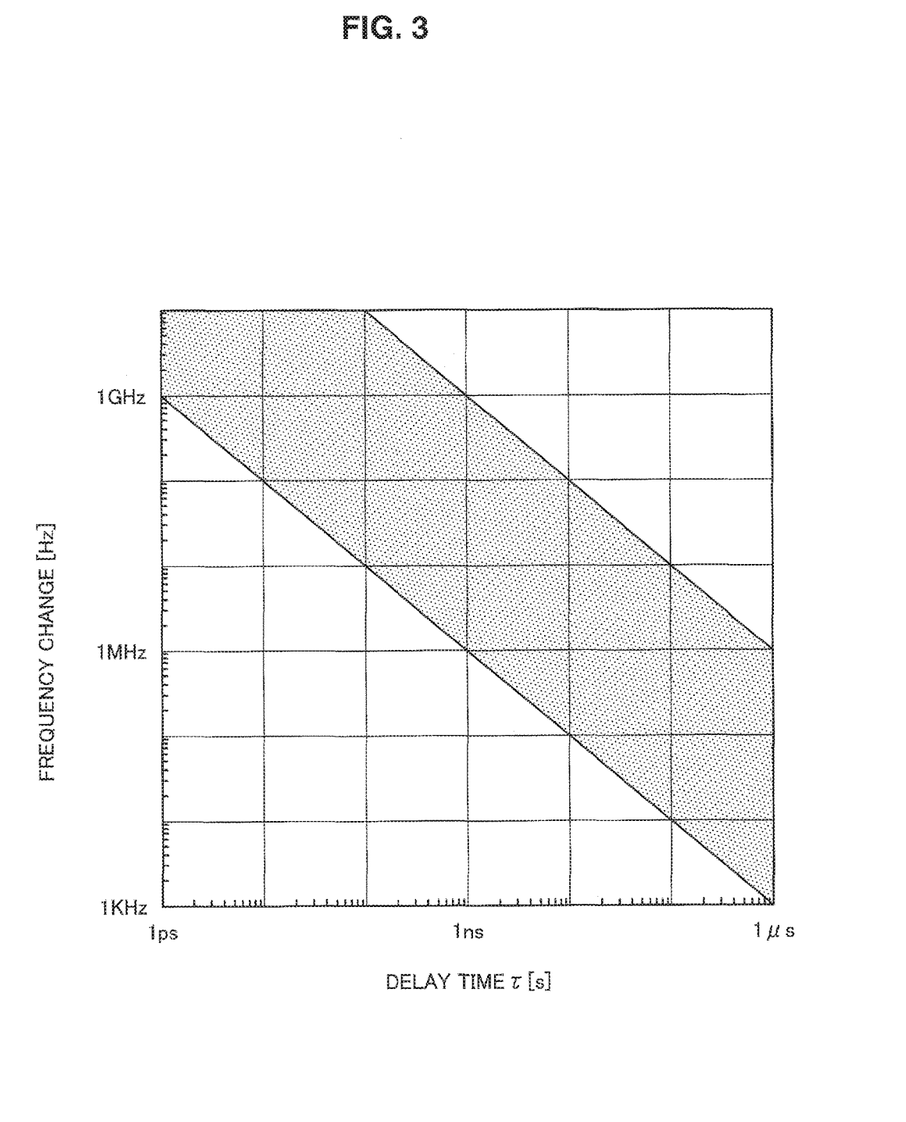
FIG. 3 is a schematic diagram illustrating the relationship between a delay time and a measureable frequency.

Part A in FIG. 2 illustrates an example where a frequency shift has occurred in a range corresponding to a time period T from a time point $t_1$ to a time point $t_2$. In this case, since the delay time $\tau$ is applied by the self-heterodyne interferometer 40, a phase change occurs between the time points $t_1$ and $t_1+\tau$, and the original state is recovered between the time points $t_2$ and $t_2+\tau$. Specifically, in order to measure a phase difference using the first optical-fiber strain measuring apparatus, a relationship of T≥τ has to be satisfied, and a measurable time resolution (i.e., spatial resolution) is determined in accordance with τ. Moreover, a measurable frequency change is also determined in accordance with the magnitude of τ. In other words, when τ increases, the measurable frequency change becomes smaller but the spatial resolution becomes larger. In contrast, when τ decreases, the spatial resolution becomes smaller but the measurable frequency change becomes larger. Accordingly, there is a trade-off relationship between the delay time and the measurable frequency. FIG. 3 illustrates the relationship between the delay time and the measurable frequency. In this case, the minimum detection sensitivity of a phase change is set between $2\pi/1000$ and $2\pi$. When the delay time τ is set to 1 ns, the frequency measurement range is between 1 MHz and 1 GHz. The delay time τ of 1 ns corresponds to a spatial resolution of 20 cm, and the frequency measurement range of 1 MHz to 1 GHz is equivalent to optical fiber strain of 0.002% to 2%. These values sufficiently satisfy the spatial resolution and the measurement accuracy for measuring optical fiber strain.

As described above, by measuring a frequency change of light as a phase difference of a beat signal provided as a result of coherent detection, two-dimensional information related to time and phase is acquired. Therefore, the measurement time is shortened, as compared with the related art in which three-dimensional information has to be acquired.

Second Embodiment

Figure 4:
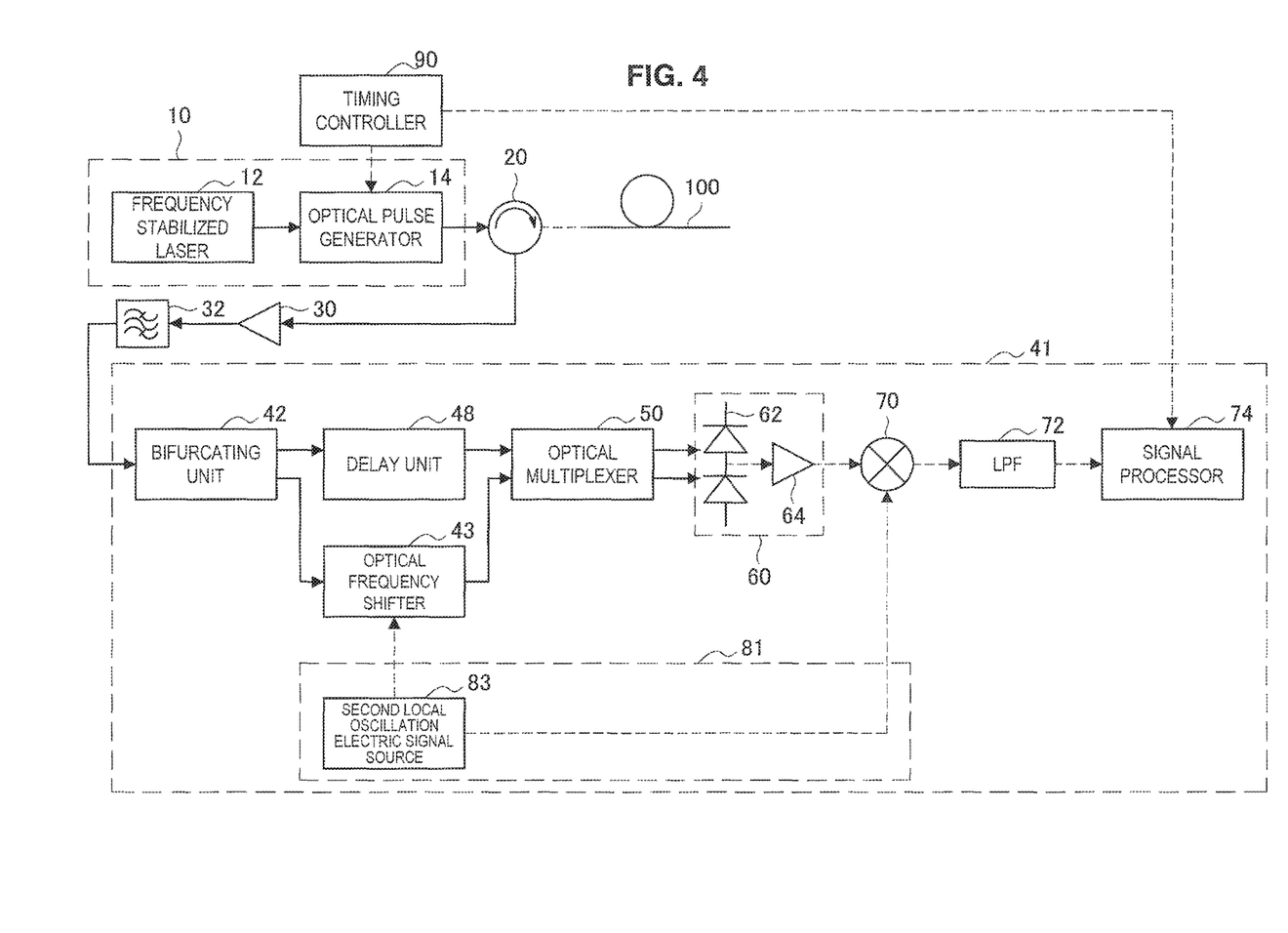
FIG. 4 is a schematic block diagram of a second optical-fiber strain measuring apparatus.

An optical-fiber strain measuring apparatus (also referred to as "second optical-fiber strain measuring apparatus" hereinafter) according to a second embodiment will be described with reference to FIG. 4. FIG. 4 is a schematic block diagram of the second optical-fiber strain measuring apparatus.

The second optical-fiber strain measuring apparatus differs from the first optical-fiber strain measuring apparatus in having a single optical frequency shifter 43 in a self-delayed heterodyne interferometer 41. Although the optical frequency shifter 43 is provided in the second optical path in this example, the optical frequency shifter 43 may alternatively be provided in the first optical path.

Since there is one optical frequency shifter, there is one local oscillation electric signal source 83 included in an electric signal generator 81. Furthermore, an electric signal from the local oscillation electric signal source 83 is input as a second electric signal to the mixer 70. Since other components are similar to those in the first optical-fiber strain measuring apparatus, redundant descriptions will be omitted.

The second optical-fiber strain measuring apparatus corresponds to a case where $f_2=0$ and $\Delta f=f_1$ in Equations (1) to (5) mentioned above. Due to having one optical frequency shifter and one local oscillation electric signal source, the second optical-fiber strain measuring apparatus is advantageous in terms of manufacturing costs, as compared with the first optical-fiber strain measuring apparatus. In contrast, since the frequencies of two light beams to be multiplexed at the optical multiplexer 50 in the first optical-fiber strain measuring apparatus are close values, the first optical-fiber strain measuring apparatus can perform the measurement with higher accuracy from the standpoint of performing homodyne detection.

Third Embodiment

Figure 5:
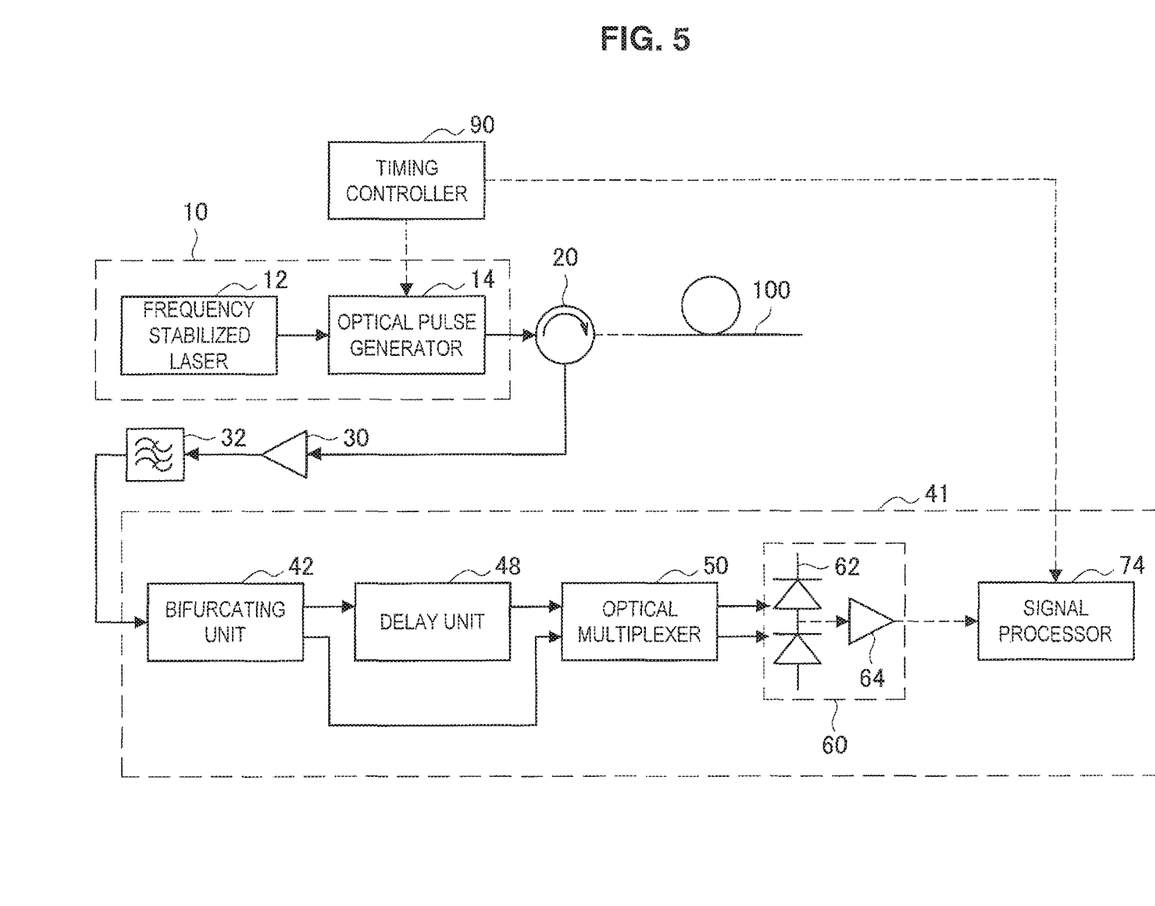
FIG. 5 is a schematic block diagram of a third optical-fiber strain measuring apparatus.

An optical-fiber strain measuring apparatus (also referred to as "third optical-fiber strain measuring apparatus" hereinafter) according to a third embodiment will be described with reference to FIG. 5. FIG. 5 is a schematic block diagram of the third optical-fiber strain measuring apparatus.

The third optical-fiber strain measuring apparatus differs from the first optical-fiber strain measuring apparatus in not having an optical frequency shifter.

In this case, the coherent detector 60 performs homodyne detection so as to generate a beat signal. Since this beat signal directly corresponds to a phase-difference signal, an electric signal generator, a mixer and, an LPF are not necessary.

The third optical-fiber strain measuring apparatus corresponds to a case where $f_1=f_2=0$ and $\Delta f=0$ in Equations (1) to (5) mentioned above. Due to not having an optical frequency shifter and a local oscillation electric signal source, the third optical-fiber strain measuring apparatus is advantageous in view of manufacturing costs, as compared with the first optical-fiber strain measuring apparatus and the second optical-fiber strain measuring apparatus.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A measuring apparatus comprising:
a light source unit configured to generate probe light;
an optical fiber configured to generate, from the probe light input thereto, Brillouin backscattered light;
a bifurcating unit configured to cause the Brillouin backscattered light to bifurcate into first light and second light;
a delay unit configured to delay one of the first light and the second light;
an optical multiplexer configured to multiplex the first light and the second light to generate multiplexed light; and
a coherent detector configured to perform homodyne detection of the multiplexed light and to output a difference frequency obtained as a result of the homodyne detection as a phase-difference signal.

2. A measuring apparatus comprising:
a light source unit configured to generate probe light;
a bifurcating unit configured to cause Brillouin backscattered light occurring from the probe light to bifurcate into first light, which propagates through a first optical path, and second light, which propagates through a second optical path;
a delay unit configured to delay one of the first light and the second light;
an optical multiplexer configured to multiplex the first light and the second light to generate multiplexed light; and
a coherent detector configured to perform homodyne detection of the multiplexed light and to output a difference frequency obtained as a result of the homodyne detection as a phase-difference signal.

3. The measuring apparatus according to claim 2, wherein the Brillouin backscattered light occurs from the probe light propagating through an optical fiber.

4. A measuring apparatus comprising:
a light source unit configured to generate probe light;
a bifurcating unit configured to cause Brillouin backscattered light, which occurs in an optical fiber from the probe light input to the optical fiber, to bifurcate into first light, which propagates through a first optical path, and second light, which propagates through a second optical path;
a shifter provided in one of the first optical path and the second optical path and configured to shift a frequency of one of the first light and the second light by about a beat frequency;
a delay unit configured to delay one of the first light and the second light;
an optical multiplexer configured to multiplex the first light and the second light to generate multiplexed light;
a coherent detector configured to perform heterodyne detection of the multiplexed light and to output a difference frequency obtained as a result of the heterodyne detection as a first electric signal;
an electric signal generator configured to generate a second electric signal having a frequency equal to a frequency of the first electric signal; and
a mixer configured to perform homodyne detection of the first electric signal and the second electric signal and to output a difference frequency obtained as a result of the homodyne detection as a phase-difference signal.

5. A measuring apparatus comprising:
a light source unit configured to generate probe light;
a bifurcating unit configured to cause Brillouin backscattered light, which occurs in an optical fiber from the probe light input to the optical fiber, to bifurcate into first light, which propagates through a first optical path, and second light, which propagates through a second optical path;
a first shifter provided in the first optical path and configured to shift a frequency of the first light by about a first frequency;
a second shifter provided in the second optical path and configured to shift a frequency of the second light by about a second frequency;
a delay unit configured to delay one of the first light and the second light;
an optical multiplexer configured to multiplex the first light and the second light to generate multiplexed light;
a coherent detector configured to perform heterodyne detection of the multiplexed light and to output a difference frequency obtained as a result of the heterodyne detection as a first electric signal;
an electric signal generator configured to generate a second electric signal having a frequency equal to a frequency of the first electric signal; and
a mixer configured to perform homodyne detection of the first electric signal and the second electric signal and to output a difference frequency obtained as a result of the homodyne detection as a phase-difference signal.

6. A measuring method comprising:
generating probe light;
causing Brillouin backscattered light occurring from the probe light to bifurcate into first light, which propagates through a first optical path, and second light, which propagates through a second optical path;
delaying one of the first light and the second light;
multiplexing the first light and the second light to generate multiplexed light; and
performing homodyne detection of the multiplexed light and outputting a difference frequency obtained as a result of the homodyne detection as a phase-difference signal.

7. The measuring method according to claim 6, wherein the Brillouin backscattered light occurs from the probe light propagating through an optical fiber.

8. A measuring method comprising:

generating probe light;

causing Brillouin backscattered light, which occurs in an optical fiber from the probe light input to the optical fiber, to bifurcate into first light, which propagates through a first optical path, and second light, which propagates through a second optical path;

shifting a frequency of one of the first light and the second light by about a beat frequency;

delaying one of the first light and the second light;

multiplexing the first light and the second light to generate multiplexed light;

performing heterodyne detection of the multiplexed light and outputting a difference frequency obtained as a result of the heterodyne detection as a first electric signal;

generating a second electric signal having a frequency equal to a frequency of the first electric signal; and performing homodyne detection of the first electric signal and the second electric signal and outputting a difference frequency obtained as a result of the homodyne detection as a phase-difference signal.

9. A measuring method comprising:

generating probe light;

causing Brillouin backscattered light, which occurs in an optical fiber from the probe light input to the optical fiber, to bifurcate into first light, which propagates through a first optical path, and second light, which propagates through a second optical path;

shifting a frequency of the first light by about a first frequency;

shifting a frequency of the second light by about a second frequency;

delaying one of the first light and the second light;

multiplexing the first light and the second light to generate multiplexed light;

performing heterodyne detection of the multiplexed light and outputting a difference frequency obtained as a result of the heterodyne detection as a first electric signal;

generating a second electric signal having a frequency equal to a frequency of the first electric signal; and performing homodyne detection of the first electric signal and the second electric signal and outputting a difference frequency obtained as a result of the homodyne detection as a phase-difference signal.

\* \* \* \* \*